US005085350A

United States Patent [19]

Sugita

[11] Patent Number: 5,085,350

[45] Date of Patent: Feb. 4, 1992

[54] PUMP ASSEMBLY WITH CONTAINER FOR STORING LIQUID IN ISOLATION FROM AMBIENT AIR

[75] Inventor: Koichi Sugita, Chiba, Japan

[73] Assignee: Kabushiki Kaisha Top, Tokyo, Japan

[21] Appl. No.: 494,534

[22] Filed: Mar. 16, 1990

[51] Int. Cl.[5] ............................................. G01F 11/00

[52] U.S. Cl. .................................... 222/260; 222/321; 222/386

[58] Field of Search ............... 222/260, 321, 327, 383, 222/386, 405; 239/333

[56] References Cited

U.S. PATENT DOCUMENTS

| | | | |
|---|---|---|---|
| 3,361,305 | 1/1968 | Spatz | 222/383 X |
| 4,694,977 | 9/1987 | Graf et al. | 222/386 X |
| 4,809,878 | 3/1989 | Rainey | 222/321 |
| 4,863,070 | 9/1989 | Andris | 222/383 X |
| 4,865,230 | 9/1989 | TugWood | 222/383 |
| 4,949,875 | 8/1990 | Kuo | 222/386 X |

FOREIGN PATENT DOCUMENTS

| | | | |
|---|---|---|---|
| 0344491 | 12/1989 | European Pat. Off. | 222/386 |
| 60-111925 | 6/1985 | Japan . | |
| 263668 | 11/1986 | Japan . | |
| 62-128168 | 6/1987 | Japan . | |
| 2197693 | 5/1988 | United Kingdom . | |

*Primary Examiner*—Kevin P. Shaver
*Assistant Examiner*—Gregory L. Huson

[57] ABSTRACT

A pump assembly for storing and discharging a liquid such as a chemical solution includes a substantially cylindrical container for storing the liquid therein. A pump is mounted on one end of the container. The pump has a suction port for drawing the liquid from the container and an outlet port for discharging the liquid. A gasket is slidably inserted in the opposite end of the container in contact with the liquid stored in the container, for sealing the liquid in the container. The gasket is slidable toward the pump when the liquid stored in the container is reduced by the pump. A slanted portion is disposed in one end of the container and has a slanted surface extending continuously from an inner peripheral surface of the container and converging away from the gasket. The suction port of the pump communicates with the interior space of the container substantially at a converging end of the slanted surface. Any trapped air is collected between the slanted surface and the liquid contained in the container, and can be discharged from the container by the pump before the liquid is discharged from the container by the pump.

12 Claims, 5 Drawing Sheets

PUMP ASSEMBLY WITH CONTAINER FOR STORING LIQUID IN ISOLATION FROM AMBIENT AIR

BACKGROUND OF THE INVENTION

The present invention relates to a pump assembly which has a container for storing a liquid such as a chemical solution in isolation from ambient air so that the stored liquid will be protected from being modified, e.g., oxidized, and which can discharge the stored liquid from the container while the liquid is being isolated from ambient air.

One known pump assembly is shown in FIG. 5 of the accompanying drawings.

The pump assembly shown in FIG. 5 comprises a substantially cylindrical container a with open opposite ends, a pump b mounted in the upper end of the container a, and a gasket c slidably inserted in the other bottom end of the container a. With the pump b mounted in the upper end of the container a, a liquid X such as a chemical solution is filled in the container a through the bottom end thereof, and thereafter the gasket c is inserted into the container a until the gasket c contacts the surface of the liquid X. The liquid X is now sealed in the container a in isolation from ambient air. After the liquid X is sealed in the container a, the bottom end of the container a is closed by an air-permeable bottom lid d.

The pump b may be a pump disclosed in Japanese Laid-Open Patent Publication No. 61(1986)-263668, for example. When a presser e of the pump b is pressed by a finger, the pump b draws in the liquid X from the container a through a suction port f and ejects the liquid X from an outlet port g. The suction port f of the pump b which is installed in the upper end of the container a extends through a neck h on the upper end thereof and is immersed in the liquid X.

When the liquid X in the container a is drawn and ejected out of the container a by the pump b, the gasket c slides toward the pump b while in contact with the surface of the liquid X as the amount of the stored liquid X is progressively reduced. Therefore, the liquid X stored in the container a remains sealed, i.e., in isolation from the ambient air, and is prevented from being modified, e.g., oxidized by contact with the ambient air.

While the liquid X sealed in the container a remains isolated from the ambient air, air often tends to flow into the container a when the liquid X is introduced into the container a. The air Y, which enters into the container a when the liquid X is filled, is trapped between the suction port f of the pump b and the neck h, and cannot easily be removed from the container a after the liquid X has been sealed in the container a.

Therefore, the liquid X in the container a may be oxidized by the trapped air Y. To prevent such oxidization of the liquid X, it has been necessary to replace the air X with a nitrogen gas when the liquid X is sealed. Such a replacing procedure is however tedious and time-consuming.

SUMMARY OF THE INVENTION

It is an object of the present invention to provide a pump assembly for ejecting a liquid such as a chemical solution from a container while isolating the liquid from ambient air, the pump assembly having a mechanism which can easily remove air, which is trapped in the container when the liquid is filled and sealed in the container, from the container after the liquid is sealed in the container.

According to the present invention, there is provided a pump assembly comprising a substantially cylindrical container for storing a liquid therein, the container having open opposite ends, a pump mounted on one end of the container and having a suction port for drawing the liquid from the container and an outlet port for discharging the liquid, a gasket slidably inserted in the opposite end of the container in contact with the liquid stored in the container, for sealing the liquid in the container, the gasket being slidable toward the pump when the liquid stored in the container is reduced by the pump, and a slanted portion disposed in the one end of the container and having a slanted surface extending continuously from an inner peripheral surface of the container and converging away from the gasket, the suction port of the pump communicating with the interior space of the container substantially at a converging end of the slanted surface.

The pump assembly further comprises an inner plug inserted in the one end of the container, the slanted portion being disposed on an end of the inner plug which faces into the container.

The slanted portion has a projection projecting outwardly from the container substantially at the converging end, the suction port being fitted over the projection, the projection having a through hole, the suction port communicating with the interior space of the container through the through hole.

The slanted surface is substantially conically shaped.

According to the present invention, there is also provided a pump assembly comprising a substantially cylindrical container for storing a liquid therein, the container having open opposite ends, a pump mounted on one end of the container and having a suction port for drawing the liquid from the container and an outlet port for discharging the liquid, a gasket slidably inserted in the opposite end of the container in contact with the liquid stored in the container, for sealing the liquid in the container, the gasket being slidable toward the pump when the liquid stored in the container is gradually discharged out by the pump, and a slanted portion disposed in and integral with the one end of the container and having a substantially conical slanted surface extending continuously from an inner peripheral surface of the container and converging away from the gasket, the slanted portion having a projection projecting outwardly from the container substantially at a converging end of the slanted surface, the projection having a through hole communicating with the interior space of the container, the suction port being fitted in the through hole such that a tip end of the suction port lies substantially flush with the converging end of the slanted surface.

According to the present invention, there is further provided a pump assembly comprising a substantially cylindrical container for storing a liquid therein, the container having open opposite ends, a pump mounted on one end of the container and having a suction port for drawing the liquid from the container and an outlet port for discharging the liquid, a gasket slidably inserted in the opposite end of the container in contact with the liquid stored in the container, for sealing the liquid in the container, the gasket being slidable toward the pump when the liquid stored in the container is gradually discharged out by the pump, and an inner plug fitted in the one end of the container, the inner plug having a slanted portion disposed in an end thereof which faces into the container and having a substantially conical slanted surface extending continuously from an inner peripheral surface of the container and converging away from the gasket, and a projection projecting outwardly from the container substantially at a converging end of the slanted surface, the projection having a through hole communicating with the interior space of the container, the suction port being fitted over the projection and communicating with the interior space of the container.

If air enters the container when the liquid is filled and sealed in the container, then the air is trapped between the slanted surface and the liquid in the container and collected along the slanted surface into a region near the converging end of the slanted surface when the container is turned upside down so that the pump is directed upwardly after the liquid is sealed in the container. At this time, the tip end of the suction port faces the liquid in the container across the air substantially at the converging end of the slanted surface. When the pump is actuated, the air is drawn along the slanted surface into the suction port and then discharged from the outlet port. Thereafter, the liquid stored in the container is drawn into the suction port and discharged from the outlet port. As the liquid is gradually discharged out of the container, the gasket is caused to slide toward the pump while in contact with the stored liquid, which is therefore kept in isolation from ambient air.

Therefore, any air which is trapped in the container can easily be removed from the container when the pump is operated after the liquid is sealed in the container. Accordingly, the liquid sealed in the container can be stored in the container without being contacted by air.

If the slanted portion is provided by the inner plug to be inserted in the end of the container on which the pump is mounted, then the pump assembly of the invention can be used with any of various containers when the inner plug is fitted in the end of the container used. Therefore, any trapped air can be removed by the pump from any of these various containers.

If the suction port of the pump is fitted over the projection projecting outwardly from the container substantially at the converging end of the slanted surface and is held in communication with the interior space of the container through the through hole defined in the projection, then since the tip end of the suction port is isolated from the interior space of the container by the slanted portion, the tip end of the suction port is prevented from contacting the liquid in the container before the trapped air is completely drained from the container. Consequently, the air trapped in the container can fully be removed.

The slanted surface which is substantially conical in shape may easily be formed integrally with the container or the inner plug.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
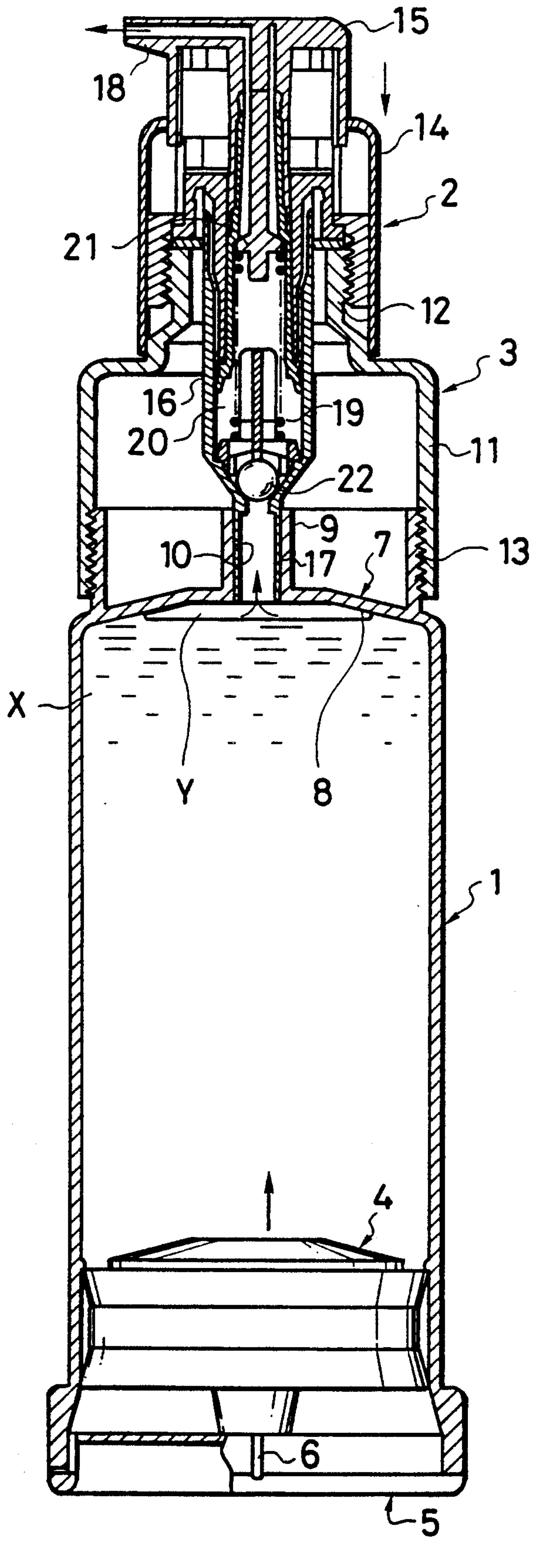
FIG. 1 is a longitudinal cross-sectional view of a pump assembly according to an embodiment of the present invention.

As shown in FIG. 1, a pump assembly according to an embodiment of the present invention comprises a substantially cylindrical container 1 with open opposite ends, a pump 2 mounted on one end (hereinafter referred to as an "upper end") of the container 1 through an adapter 3, for drawing and ejecting a liquid X which is filled in the container 1, a gasket 4 slidably inserted in the other end (hereinafter referred to as a "bottom end") of the container 1 which is filled with the liquid X, and a bottom lid 5 fitted in the bottom end of the container 1 in which the gasket 4 is inserted. The bottom lid 5 has a vent hole 6 through which a space between the bottom lid 5 and the gasket 4 communicates with the exterior space of the container 1.

The container 1 has a substantially conical slanted portion 7 on its upper end, the slanted portion 7 being concentric with a barrel portion of the container 1. The slanted portion 7 has an inner slanted surface 8 which extends continuously from the inner peripheral surface of the barrel portion of the container 1 and converges upwardly into a projection 9 projecting upwardly from the center of the upper surface of the slanted portion 7. The projection 9 has a vertical through hole 10 communicating with the interior space of the container 1.

The adapter 3 is in the form of a hollow cylinder comprising a larger-diameter portion 11 which is of substantially the same diameter as the container 1 and a smallerdiameter portion 12 joined concentrically to the larger-diameter portion 11 and having a diameter smaller than the diameter of the larger-diameter portion 11. The larger-diameter portion 11 is threaded over an externally threaded annular wall 13 disposed on and extending around the slanted portion 7. The projection 9 is concentrically positioned in the larger-diameter portion 11. The pump 2 has a cylindrical case 14 concentrically threaded over the smaller-diameter portion 12 of the adapter 3. In this manner, the pump 2 is mounted on the upper end of the container 1.

The pump 2 is of a construction which is basically the same as the pump disclosed in Japanese Laid-Open Patent Publication No. 61(1986)-263668. The pump 2 has a vertically movable presser 15 projecting upwardly from the upper end of the case 14, a suction port 17 integral with the lower distal end of a cylinder 16 which is fixed to the case 14 and extends concentrically downwardly from within the case 14, and an outlet port 18 extending laterally from the upper end of the presser 15.

The suction port 17 is inserted in the through hole 10 in the projection 9 such that the lower tip end of the suction port 17 lies flush with the converging end of the slanted surface 8 of the slanted portion 7. The presser 15 is normally urged to move upwardly by a spring 19 disposed in the cylinder 16. The cylinder 16 defines therein a pump chamber 20 which can be pressurized when the presser 15 is depressed. The interior space of the outlet port 18 communicates with the pump chamber 20 through a valve 21 which is opened when the presser 15 is depressed. The interior space of the suction port 17 communicates with the pump chamber 20 through a valve 22 which is opened in response to a reduction in the pressure in the pump chamber 20 when the presser 15 returns to its original position under the bias of the spring 19.

When the presser 15 of the pump 2 is depressed by a finger and then released so as to return to its original position, the liquid X filled in the container 1 is drawn through the suction port 17 and the valve 22 into the pump chamber 20. When the presser 15 is depressed again, the liquid X which has been drawn into the pump chamber 20 is ejected out of the outlet port 18 through the valve 21.

A process of filling and sealing the liquid X in the container 1 will now be described with reference to FIGS. 1 and 2.

Figure 2:
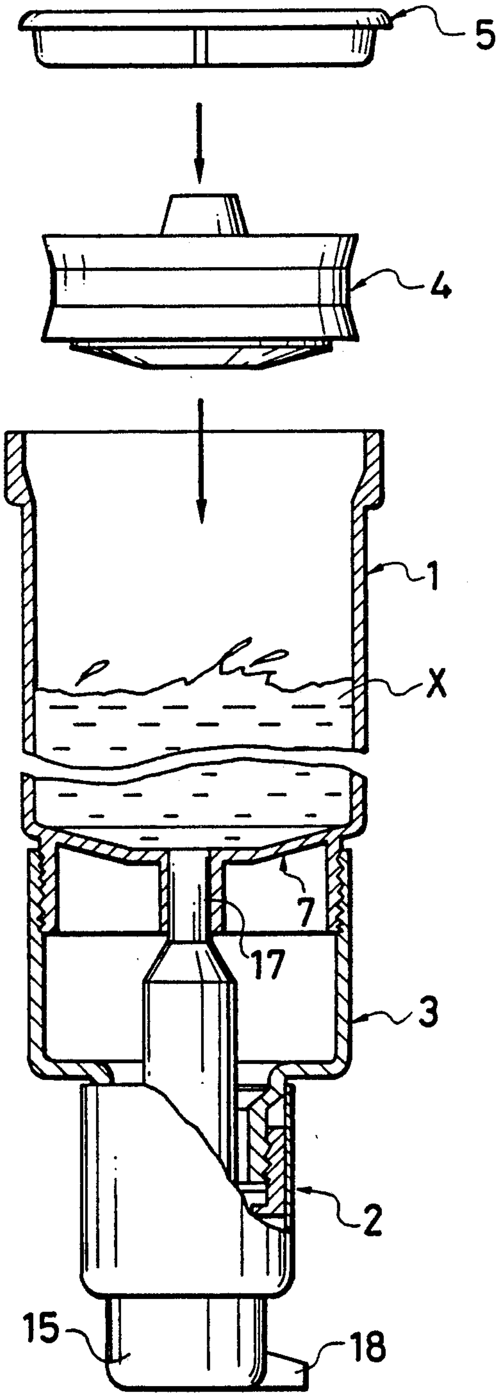
FIG. 2 is a fragmentary, partly exploded cross-sectional view showing the manner in which a liquid is filled and sealed in the container of the pump assembly shown in FIG. 1.

To fill and seal the liquid X in the container 1, the pump 2 is mounted on the upper end of the container 1, and, thereafter the container 1 is turned upside down to direct the upper end thereof downwardly, as shown in FIG. 2. Then, the liquid X is filled in the container 1 through the bottom end thereof which is now positioned upwardly.

Then, the gasket 4 is inserted into the container 1 through its bottom end until the gasket 4 is brought into contact with the surface of the liquid X. The liquid X is now sealed in the container 1.

Subsequently, the bottom lid 5 is fitted into the bottom end of the container 1, thereby closing the bottom end. The container 1 is reversed again to direct its upper end upwardly, as shown in FIG. 1.

While the liquid X is being filled and sealed in the container 1 as described above, air Y may be trapped in the container 1. When the upper end of the container 1 is directed upwardly as shown in FIG. 1, the air Y which is trapped in the container 1 rises in the liquid X and is collected along the slanted surface 8 toward the converging end thereof, i.e., immediately below the tip end of the suction port 17 of the pump 2. Therefore, the tip end of the suction port 17 does not directly contact the liquid X, but faces the liquid X through the trapped air Y.

Then, the presser 15 is depressed and released so as to return to its original position. At this time, the air Y is drawn along the slanted surface 8 through the suction port 17 into the pump chamber 20. When the presser 15 is depressed again, the trapped air Y is discharged from the pump chamber 20 through the outlet port 18. This process is repeated to discharge the air Y gradually from within the slanted portion 7. The gasket 4, while being held in contact with the liquid X, is caused to slide in the container 1, forcing the liquid X toward the suction port 17. At the same time that the air Y is entirely removed from within the slanted portion 7, the tip end of the suction port 17 contacts the liquid X in the container 1. Thereafter, the liquid X is drawn from the suction port 17 and ejected from the outlet port 18. At this time, the liquid X in the container 1 is sealed in the container 1 while being isolated from, i.e., out of contact with, the ambient air.

With the pump assembly of the present invention, after the liquid X is filled and sealed in the container 1, the pump 2 is operated to discharge the air Y which may be trapped in the container 1 when the liquid X is filled in the container 1. Therefore, the liquid X is stored in the container 1 in isolation from the ambient air, and can be discharged from the container 1 when necessary.

Figure 3:
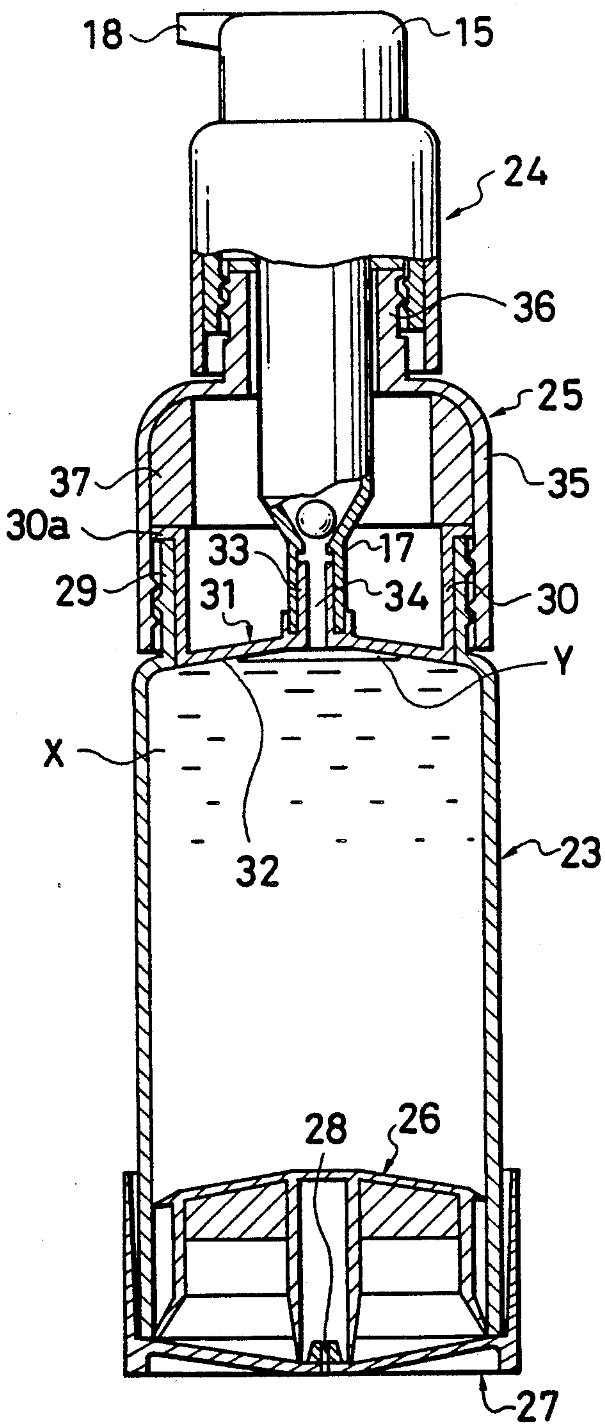
FIG. 3 is a longitudinal cross-sectional view of a pump assembly according to another embodiment of the present invention.
Figure 4:
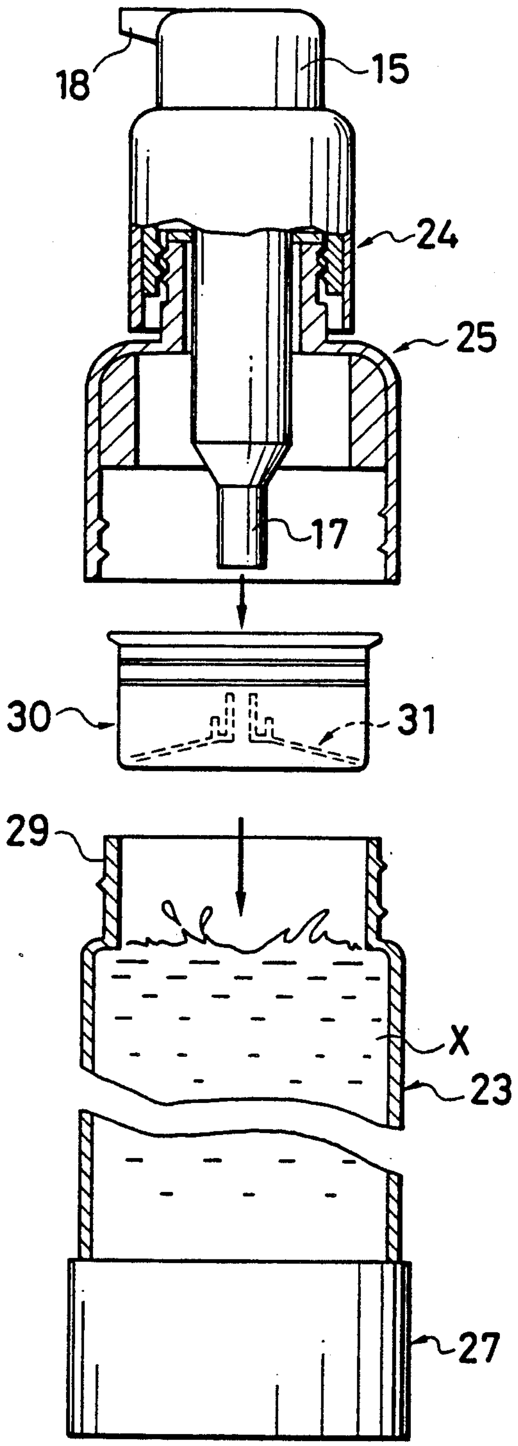
FIG. 4 is a fragmentary, partly exploded cross-sectional view showing the manner in which a liquid is filled and sealed in the container of the pump assembly shown in FIG. 3.
Figure 5:
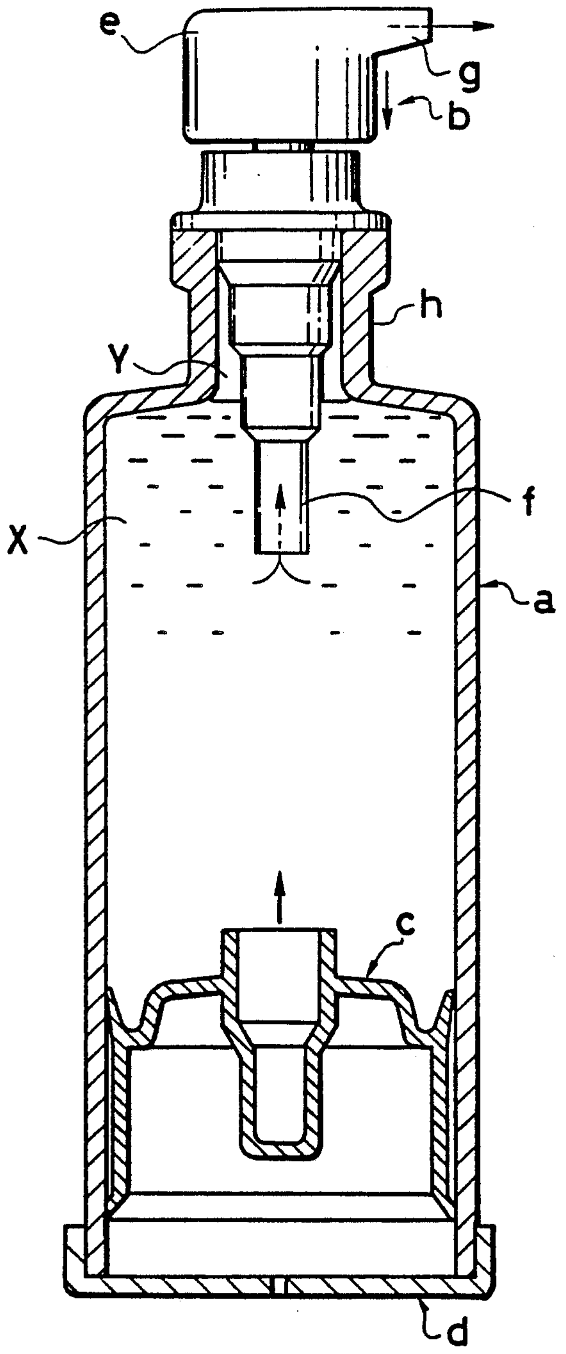
FIG. 5 PRIOR ART
FIG. 5 is a longitudinal cross-sectional view of a prior art pump assembly.

A pump assembly according to another embodiment of the present invention is shown in FIGS. 3 and 4.

As shown in FIG. 3, the pump assembly comprises a substantially cylindrical container 23 with open opposite ends, a pump 24 mounted on one end (hereinafter referred to as an "upper end") of the container 23 through an adapter 25, a gasket 26 slidably inserted in the other end (hereinafter referred to as a "bottom end") of the container 23 which is filled with the liquid X, and a bottom lid 27 fitted in the bottom end of the container 1 in which the gasket 26 is inserted. The bottom lid 27 has a vent hole 28, as with the bottom lid 5 shown in FIG. 1.

The pump 24 is of the same structure as the pump 2, and has the presser 15, the suction port 17, and the outlet port 18.

The upper end of the container 1 opens outwardly through a neck 29 whose diameter is slightly smaller than the diameter of the barrel portion of the container 1. A hollow inner plug 30 having an open upper end is inserted in the neck 29. The inner plug 30 has a lateral flange 30*a* on its upper end, which engages the upper end of the neck 29.

The inner plug 30 has a substantially Conical slanted portion 31 on its lower end, the slanted portion 31 being of the same configuration as the slanted portion 7 shown in FIG. 1. With the inner plug 30 fitted in the neck 29, the slanted portion 31 has an inner slanted surface 32 which extends continuously from the inner peripheral surface of the barrel portion of the container 23 and the neck 29 and converges upwardly into a projection 33 projecting upwardly from the center of the slanted portion 31. The suction port 17 of the pump 24 is fitted over the projection 33. The projection 33 has a vertical through hole 34 communicating with the interior space of the container 23.

The adapter 25 is of the same profile as the adapter 3 shown in FIG. 1. The adapter 25 has a larger-diameter portion 35 whose lower portion is threaded over the neck 29 of the container 23, with the neck 29 and the inner plug 30 being concentrically disposed in the larger-diameter portion 35. The adapter 25 also has a smaller-diameter portion 36 concentrically threaded in the case 14 of the pump 24. In this manner, the pump 24 is mounted on the upper end of the container 23. The suction port 17 of the pump 24 is fitted over the projection 33 such that the lower tip end of the suction port 17 abuts against the upper surface of the slanted portion 31 substantially near the converging end of the slanted surface 32.

An annular member 37 is fixed to the upper inner peripheral surface of the larger-diameter portion 35 of the adapter 25. When the larger-diameter portion 35 is threaded over the neck 29, the annular member 37 and the neck 29 clamp the flange 30*a* therebetween, thereby securely holding the inner plug 30 in position.

To fill and seal the liquid X in the container 23, the inner plug 30 is fitted in the neck 29. Then, the liquid X may be filled in the container 23 through the bottom end thereof and then sealed therein in the same manner as described with respect to the container 1 shown in FIG. 1.

Alternatively, as shown in FIG. 4, the gasket 26 is inserted in the bottom end of the container 23, and the bottom end thereof is closed by the bottom lid 27. Thereafter, the liquid X is filled in the container 27 through the neck 29 on the upper end thereof, after which the pump 24 is mounted on the upper end of the container 23 through the adapter 25, thus sealing the liquid X in the container 23.

If air Y is trapped in the container 23 when the liquid X is filled and sealed in the container 23, then the air Y is connected along the slanted surface 32 toward a region directly below the suction port 17 of the pump 24. The pump 24 is then actuated to draw the trapped air Y from the suction port 17 and discharge the air Y from the outlet port 18. The trapped air Y can therefore be removed from the container 23.

Since the tip end of the suction port 17 is isolated from the interior space of the container 23 by the slanted portion 31, the tip end of the suction port 17 is prevented from contacting the liquid X in the container 23, failing to remove any remaining trapped air Y, before the air Y is completely drained from the container 23. Consequently, the air Y trapped in the container 23 can fully be removed.

The slanted portion 31 for collecting any trapped air Y into the region directly beneath the suction port 17 is provided by the inner plug 30 which is fitted in the container 23. Therefore, the pump assembly shown in FIGS. 3 and 4 may be incorporated in a container which has no slanted portion on its upper end, as with the container 23, for the removal of trapped air.

Although certain preferred embodiments have been shown and described, it should be understood that many changes and modifications may be made therein without departing from the scope of the appended claims.

What is claimed is:

1. A pump assembly comprising:
- a substantially cylindrical container storing a liquid therein, said container having open opposite ends;
- a pump mounted on one end of said container and having a suction port for drawing the liquid form said container and an outlet port for discharging the liquid;
- a gasket slidably inserted in the opposite end of said container in contact with the liquid stored in the container, for sealing the liquid in said container, said gasket being slidable toward said pump when the liquid stored in said container is gradually discharged out by said pump; and
- a slanted portion disposed in and integral with said one end of the container and having a substantially conical slanted surface extending continuously from an inner peripheral surface of said container and converging away from said gasket, said slanted portion having a projection projecting outwardly from said container substantially at the converging end of said slanted surface, said projection having a through hole communicating with the interior space of said container, said suction port being fitted in said through hole such that a tip end of said suction port lies substantially flush with said converging end of said slanted surface.

2. The pump assembly according to claim 1, wherein the suction port is generally rigid and nonflexible such that the port is readily insertable into the projection when the suction port is fitted in said through hole.

3. The pump assembly according to claim 2, wherein said gasket has a slanted surface which conforms to the slanted surface of the slanted portion of the container, the slanted surface of the gasket being in mating engagement with the slanted surface of the container when the liquid is fully discharged from the container.

4. A pump assembly comprising:
- a substantially cylindrical container storing a liquid therein, said container having open opposite ends;
- a pump mounted on one end of said container and having a suction port for drawing the liquid from said container and an outlet port for discharging the liquid;
- a gasket slidably inserted in the opposite end of said container in contact with the liquid stored in the container, for sealing the liquid in said container, said gasket being slidable toward said pump when the liquid stored in said container is gradually discharged out by said pump; and
- an inner plug fitted in said one end of the container, said inner plug having a slanted portion disposed in an end thereof which faces into said container, said slanted portion having a substantially conical slanted surface extending continuously from an inner peripheral surface of said container and converging away from said gasket, and a projection projecting outwardly from said container substantially at the converging end of said slanted surface, said projection having a through hole communicating with the interior space of said container, said suction port being fitted over said projection and communicating with the interior space of said container.

5. The pump assembly according to claim 4, wherein said suction port is generally rigid and nonflexible such that the port is readily insertable over said projection when the suction port is fitted over said projection.

6. The pump assembly to claim 5, wherein said gasket has a slanted surface which conforms to the slanted surface of the slanted portion of the inner plug, the slanted surface of the gasket being in mating engagement with the slanted surface of the inner plug when the liquid is fully discharged from the container.

7. A pump assembly comprising:
- a substantially cylindrical container storing a liquid therein, said container having open opposite ends;
- a pump mounted on one end of said container and having an elongated suction port for drawing the liquid from said container and an outlet port for discharging the liquid;
- a gasket slidably inserted in the opposite end of said container in contact with the liquid stored in the container, for sealing the liquid in said container, said gasket being slidable toward said pump when the liquid sore din said container is reduced by said pump; and
- a slanted portion disposed in said one end of the container and having a slanted surface extending continuously from an inner peripheral surface of said container and converging away from said gasket, said slanted portion having a projection projecting outwardly from said container substantially at said converging end, said projection having a through hole, said suction port of said pump being filed with said projection and communicating with the interior space of said container substantially at the converging end of said slanted surface.

8. The pump assembly according to claim 7, further comprising an inner plug inserted in said one end of the container, said slanted portion being disposed on an end of said inner plug which faces into said container.

9. The pump assembly according to claim 7, wherein said suction port is fitted over said projection, said suction port communicating with the interior space of said container through said through hole.

10. The pump assembly according to claim 7, wherein said slanted surface is substantially conically shaped.

11. The pump assembly according to claim 7, wherein the elongated suction port is generally rigid and non-flexible such that the port is readily insertable into the projection portion during manufacture of the pump assembly.

12. The pump assembly according to claim 11, wherein said gasket has a slanted surface which conforms to the slanted surface of the slanted portion of the container, the slanted surface of the gasket being in mating engagement with the slanted surface of the container when the liquid is fully discharged from the container.

* * * * *